US011628625B2

(12) United States Patent
Lavazza et al.

(10) Patent No.: US 11,628,625 B2
(45) Date of Patent: Apr. 18, 2023

(54) SYSTEM AND METHOD FOR CUSTOM MATERIAL, REPLACEMENT

(71) Applicant: State Farm Mutual Automobile Insurance Company, Bloomington, IL (US)

(72) Inventors: Ivan R. Lavazza, Bloomington, IL (US); Edward P. Matesevac, Normal, IL (US); John H. Hunt, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 392 days.

(21) Appl. No.: 16/773,403

(22) Filed: Jan. 27, 2020

(65) Prior Publication Data

US 2022/0234297 A1 Jul. 28, 2022

(51) Int. Cl.
*B29C 64/386* (2017.01)
*G06Q 40/08* (2012.01)
*B33Y 80/00* (2015.01)
*G06Q 50/04* (2012.01)
*B33Y 50/00* (2015.01)

(52) U.S. Cl.
CPC ............ *B29C 64/386* (2017.08); *B33Y 50/00* (2014.12); *B33Y 80/00* (2014.12); *G06Q 40/08* (2013.01); *G06Q 50/04* (2013.01)

(58) Field of Classification Search
CPC ....... B29C 64/386; B33Y 50/00; B33Y 80/00; G06Q 40/08; G06Q 50/04
See application file for complete search history.

(56) References Cited

U.S. PATENT DOCUMENTS

| 7,080,080 | B1* | 7/2006 | Miller ................. G06Q 30/06 |
| 9,582,832 | B1* | 2/2017 | Dewey ................ G06T 7/0004 |
| 9,721,400 | B1* | 8/2017 | Oakes, III ........... G07C 5/0808 |
| 10,373,260 | B1* | 8/2019 | Haller, Jr. ............ G06V 10/751 |
| 10,949,814 | B1* | 3/2021 | Nelson ................. G06N 20/00 |
| 2015/0073864 | A1* | 3/2015 | Labrie ............... G06Q 30/0201 |
| | | | 705/7.29 |
| 2016/0147217 | A1* | 5/2016 | Davis ..................... G06T 15/10 |
| | | | 700/97 |
| 2018/0300433 | A1* | 10/2018 | Maxam .................. G06F 30/13 |
| 2018/0341249 | A1* | 11/2018 | Abuelsaad ......... G05B 19/4099 |
| 2019/0303782 | A1* | 10/2019 | Bohnhoff-Hlavacek .................... |
| | | | B33Y 50/00 |
| 2020/0236343 | A1* | 7/2020 | Holzer ................... G01C 21/32 |
| 2021/0225038 | A1* | 7/2021 | Holzer ..................... G06N 3/02 |

\* cited by examiner

*Primary Examiner* — Thomas C Lee
*Assistant Examiner* — Ameir Myers
(74) *Attorney, Agent, or Firm* — Faegre Drinker Biddle & Reath LLP

(57) ABSTRACT

A method for generating a material for a partial replacement includes receiving an image of a sample of an original material needing to be replaced, generating a representative data set for the original material based on the image received, accessing a reference database comprised of a plurality of different materials and including reference texture data or reference characteristic data for each of the plurality of different materials, comparing the representative data set to the reference data in the reference database, identifying at least one of the plurality of different materials correlated to the representative data set, determining the identified correlated material is not available, sending a request to generate a replacement material, and generating the replacement material.

19 Claims, 7 Drawing Sheets

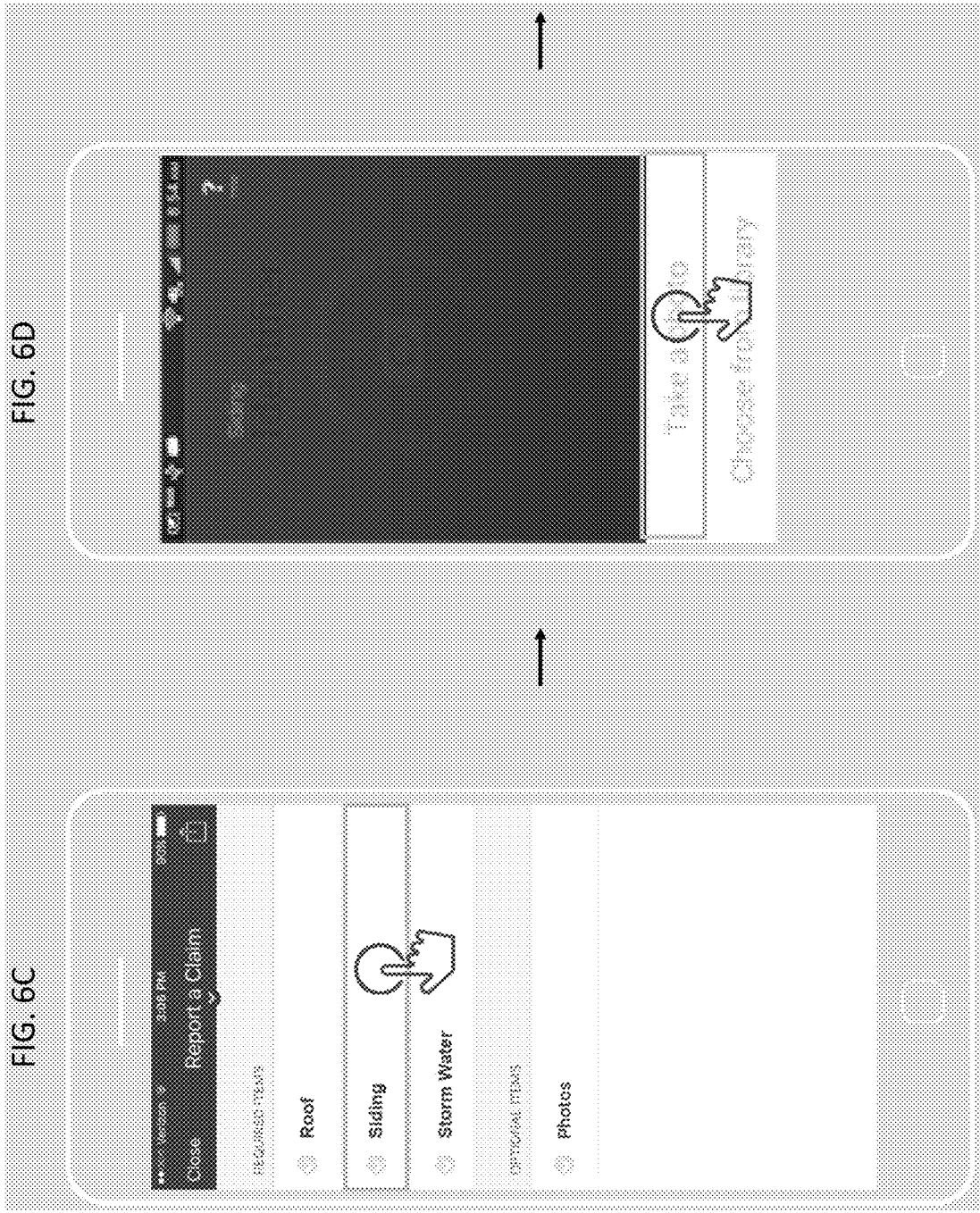

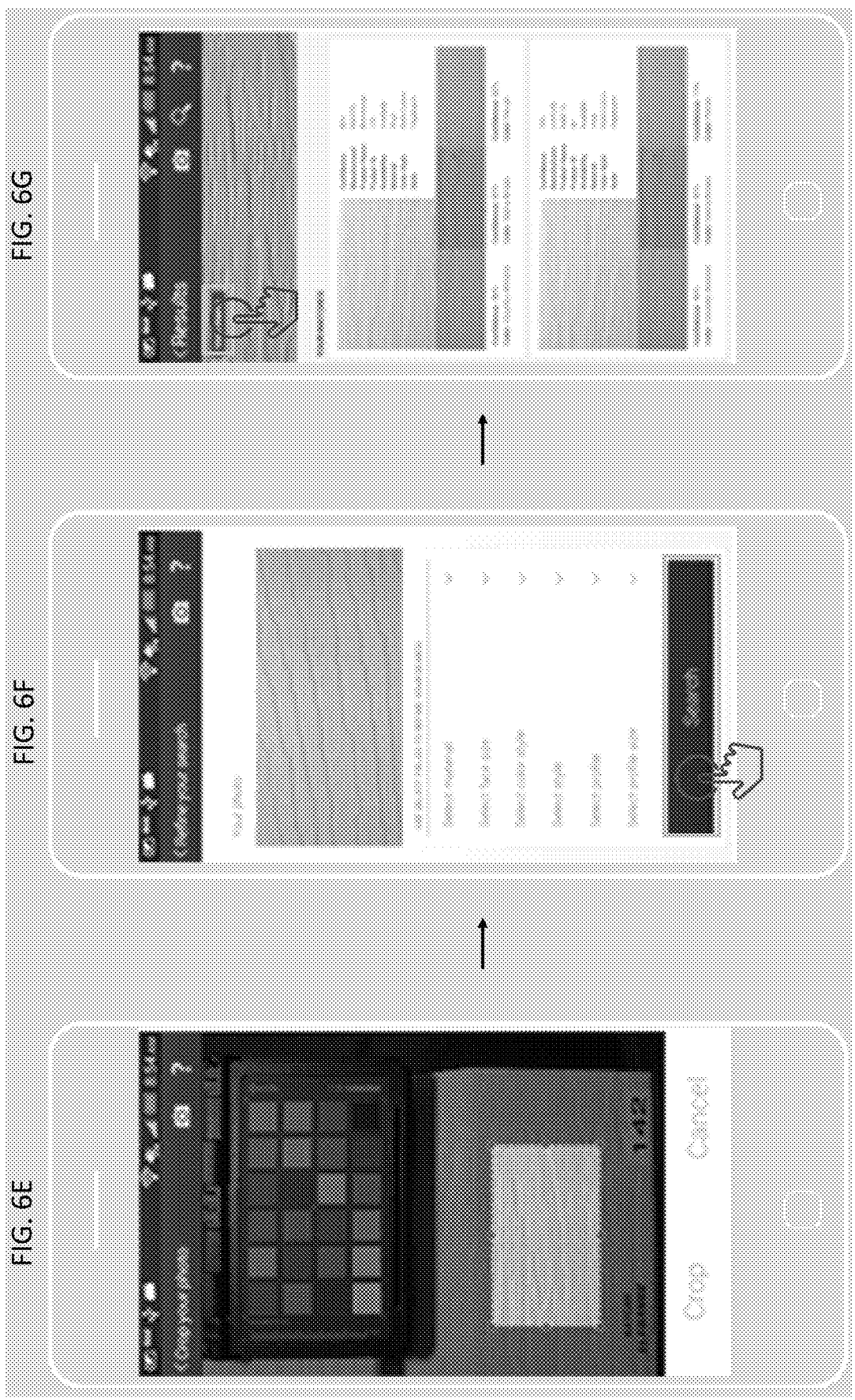

SYSTEM AND METHOD FOR CUSTOM MATERIAL, REPLACEMENT

FIELD OF THE DISCLOSURE

This disclosure generally relates to replacement of materials and, more particularly, to generating custom material as a replacement for damaged materials to match discontinued and/or weathered construction materials during a claims process between an insured and the insurance company.

BACKGROUND

During a claim handling process, insurance companies must weigh various factors to determine the most efficient method to replace and/or repair losses by a policy holder. These factors apply whether the loss is to a vehicle, a building, or any other insured item. For example, if the hood of an automobile is damaged, relevant factors may include the cost of a replacement hood, the cost of repairing the original hood, whether a replacement hood is available in a timely manner, the difficulty of matching the paint for the replacement hood with that on the rest of the automobile, and more. If the cost of repairing the damaged portion of a vehicle exceeds certain thresholds, the insurance company may "total" the vehicle and provide the customer with a payment of replacement value as determined by the terms of the relevant insurance policy.

In the case of damaged roofing, siding, and/or other material on a house or building, it is typically more cost-effective to replace only the damaged portion rather than the entire roof, all of the siding, etc. This option (called "partial replacement") may not be available, however, if the particular brand/model of material is no longer being produced or the original material is so aged and/or weathered that a brand-new section of the same material will not match. For these and other reasons, the policy holder may prefer a complete replacement to a partial replacement.

SUMMARY

This summary is provided to introduce teachings of the present disclosure in a simplified form. The teachings are not limited to this summary, nor should the summary be read to limit the scope of the claimed subject matter.

In one embodiment, a method for generating a material for a partial replacement comprises receiving an image of a sample of an original material needing to be replaced, generating a representative data set for the original material based on the image received, accessing a reference database comprised of a plurality of different materials and including reference texture data or reference characteristic data for each of the plurality of different materials, comparing the representative data set to the reference data in the reference database, identifying at least one of the plurality of different materials correlated to the representative data set, determining the identified correlated material is not available, sending a request to generate a replacement material, and generating the replacement material.

In another embodiment, a system for generating a replacement material at a custom manufacturing facility comprising a processor, a non-transitory storage medium, and a set of computer readable instructions stored in the non-transitory storage medium and, when executed by the processor, configured to receive an image of a sample of an original material needing to be replaced, generate a representative data set for the original material based on the image received, access a reference database comprised of a plurality of different materials and including reference texture data or reference characteristic data for each of the plurality of different materials, compare the representative data set to the reference data in the reference database, identify at least one of the plurality of different materials correlated to the representative data set, determine the identified correlated material is not available, and send a request to the custom manufacturing facility to generate a replacement material.

In yet a further embodiment, a method for generating a replacement material comprises providing a claims handling application to a user for installation on an information handling device, and collecting claims data at an insurance company server, the claims data transmitted by the information handling device through the claims handling application to the server. The server comprises a processor and a memory that stores the claims data, wherein the server receives an image of a sample of an original material needing to be replaced, generates a representative data set for the original material based on the image received, accesses a reference database comprised of a plurality of different materials and including reference texture data or reference characteristic data for each of the plurality of different materials, compares the representative data set to the reference data in the reference database, identifies at least one of the plurality of different materials correlated to the representative data set, determines the identified correlated material is not available, and sends a request to a custom manufacturing facility to generate a replacement material.

BRIEF DESCRIPTION OF THE DRAWINGS

FIGS. 6A-6G are drawings showing example screenshots that might be generated by an application for display on a user's mobile device, according to teachings of the present disclosure.

Figure 1:
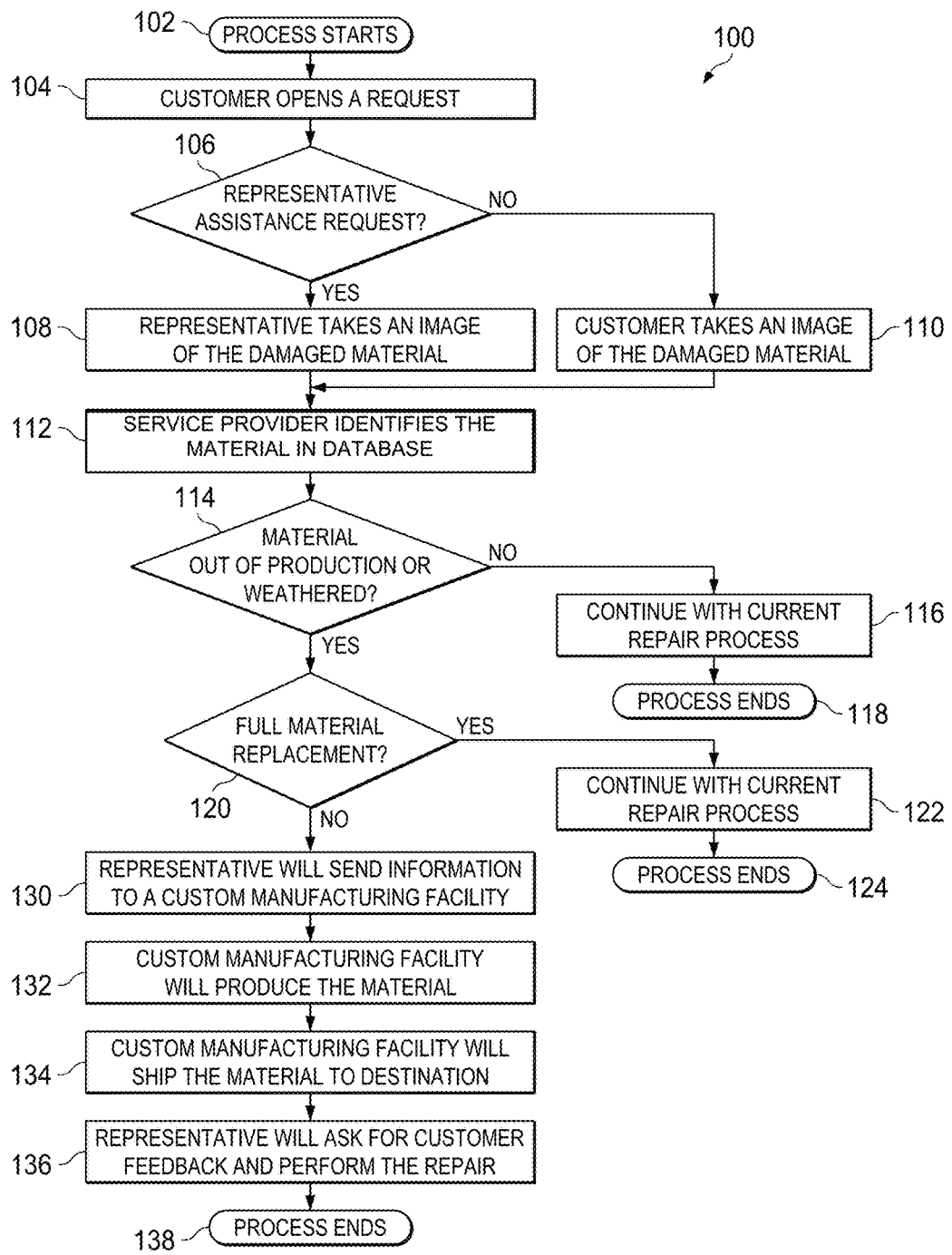
FIG. 1 is a flowchart illustrating an illustrative method for replacing damaged materials according to teachings of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the disclosure in any manner.

DETAILED DESCRIPTION

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

Known methods for settling claims include multiple visits, calls, or other contact from and/or to adjusters, repair shops, contractors, etc. If options for a partial replacement are difficult to ascertain or time-consuming for the policy holder, the claims process may be even more frustrating than the original loss. A quick and efficient system for providing replacement materials may increase customer satisfaction as well as reduce costs related to insured losses.

Exterior siding (e.g., on a home or other building), roofing materials, window sills, window trim, plumbing fixtures, plumbing joints, plumbing materials, flooring, countertops, and other construction materials have presented difficulty for repair projects. It may be difficult to identify the original material used in construction. In some cases, the original material may be weathered and/or otherwise aged to the extent that new replacement material will not match. In other cases, the original material may be out of production or unavailable in an acceptable time frame. In any of these situations, current methods for settling claims may result in a complete replacement of both the damaged portion of the materials as well as undamaged material, what may be called a "complete replacement."

Additionally, incorrect identification of the original construction material may lead to delays and/or increased expenses. For example, replacement material may be delivered and installed but not sufficiently match the existing material to the satisfaction of the policy holder (e.g., pattern, texture, color, etc.). Removal, return, and/or replacement of the replacement material(s) adds time and cost to a repair process.

Targeted partial replacements of construction materials may provide savings in time, cost, and other factors for both an insurance company and the policy holder. The teachings of the present disclosure provide methods and systems allowing efficient use of targeted partial replacements for insurance companies and policy holders, whether for damaged buildings, vehicles, or other insured losses.

Embodiments of the present disclosure and their advantages over the prior art may be best understood by reference to the Figures described below.

FIG. 1 is a flowchart illustrating an example method 100 for replacing damaged materials according to teachings of the present disclosure. Example method 100 may include various steps illustrated in FIG. 1, but the order of the steps may be varied without departing from the scope of the present disclosure. In addition, persons having ordinary skill in the art will be able to add or remove steps without departing from the scope. In general, if a customer suffers a loss and/or damage to its property, then a service provider may facilitate repair and/or replacement of the customer's loss. Method 100 may be appropriate for many types of loss, not limited to those which implicate the need for custom manufacturing of replacement material.

At Step 102, method 100 begins with a customer realizing a loss or damage to its property and starting the repair process. In some examples, this may be an insured loss, such as damage to siding or roofing material on a building or house. In some embodiments, there may or may not be an insurance policy related to the loss, but one or more service representatives may provide assistance to the customer through a loss repair application or request process. The one or more service representatives may be employed by a repair service company, an insurance company, and/or any other service provider. In some embodiments, method 100 may be a service available by subscription and/or pay-per-use.

At Step 104, the customer may open a request. Opening a request may include contacting the service provider by telephone, email, and/or any other appropriate means. In some embodiments, the customer will use a web-based contact form or an application running on the customer's mobile device (e.g., a smart phone, a laptop/notebook computer, etc.).

The request may include any customer data that may facilitate providing service. For example, customer data may include customer identification information (e.g., customer name and contact information). Customer data may include information related to the loss, including identification of the loss and/or damaged property. When an insurance company is the service provider, the customer data may include a policy number and/or other data identifying the relationship between the customer and the insurance company. As another example, if the service provider is a home warranty and/or construction warranty company, the customer data may identify a warranty contract and/or other relationship between the customer and the service provider.

At Step 106, the customer may elect whether to request assistance from a representative (a "rep" or "claim rep"). In embodiments employed by an insurance company, customers may be familiar and/or comfortable and, therefore, prefer to proceed with a claim representative to manage a claim for repair to home damage and/or vehicle damage. In other embodiments, a customer may have the option to use a repair representative to facilitate the process even if there is no insured loss. If the customer elects to proceed with a "self-service" claim, method 100 proceeds to Step 108. If the customer elects to proceed with assistance of a representative, method 100 moves to Step 110.

At Step 108, a representative of the service provider investigates the claim and the damaged material(s). Step 108 may include taking one or more images of the damaged material and/or the nearby undamaged materials. In the example of siding damage, Step 108 may include taking a photograph of the wall and/or the damaged area. Step 108 may include taking a rubbing of the undamaged siding to allow analysis of the texture of the siding. In other examples, Step 108 may include an image of other identifying marks and/or features of a damaged material (e.g., the VIN of a damaged vehicle, the paint color of a damaged vehicle, the color and/or texture of roofing material, etc.). The one or more images may be captured using a mobile device (e.g., a smartphone, a camera, etc.). Alternatively, the representative may remotely obtain such images using unmanned aerial vehicles ("UAVs" or drones), self-driving cars with cameras, other manners of providing a camera to the location of the damage, or with cameras already present at the location of the damage (e.g., security cameras, neighborhood cameras, etc.).

At Step 110, if the customer elects, he or she may capture one or more images showing the damage and/or the nearby undamaged materials. The various aspects of capturing the image may be similar to those of Step 108. In embodiments providing an application running on the customers' mobile device, the application may provide a user interface for capturing the images.

Both Step 108 and Step 110 may further include sending the one or more images to the service provider. This may include uploading an image from a mobile device to email and/or to the provider's website. In embodiments using an application running on a mobile device, the application may provide a user interface for sending the images.

Step 112 may include identifying the damaged material. In some embodiments, the service provider may host a database holding information related to various materials, including construction materials, vehicle manufacturing materials, etc. The discussion of FIG. 2 below provides a detailed description of one embodiment of a system for identifying a particular construction material.

At Step 114, the service provider determines whether the identified material has an available replacement. For example, the particular material may be out of production. In another example, although the original material is still available, the surrounding, undamaged material may be so weathered that replacing the damaged material with brand new replacement material is not a satisfactory option. Step 114 may include a request to the original manufacturer and/or a search of material suppliers to determine inventory, time to fill an order, etc.

If the identified replacement material is available and matches the remaining undamaged material, method 100 may proceed to Step 116. As an example, a damaged portion of an automobile may be available for purchase and installation without challenge. As another example, roofing shingles may be available that match the current roofing materials and repairs may proceed by purchasing an appropriate quantity of said roofing shingles. At Step 116, the requested repairs may be performed using any appropriate methods and/or systems.

After the requested repairs are complete in Step 116, method 100 may terminate at Step 118.

If, however, the potential replacement is not available and/or doesn't sufficiently match the remaining materials, method 100 may proceed to Step 120. At Step 120, the service provider may determine whether to do a full replacement or a partial replacement. As an example, if the service provider determines 75% of a particular roof is damaged, it may be cheaper to replace the entire roof rather than to buy the specific roofing material required to replace the damaged portion(s). In another example, the cost to acquire a sufficient amount of replacement material matching the undamaged portion may be more expensive than replacing the entire roof with an equivalent material.

If the service provider determines a full replacement is appropriate, method 100 proceeds to Step 122. At Step 122, the requested replacement may be performed using any appropriate methods and/or systems. For example, the service provider may contract with a roofing company to replace the entire roof, with a siding company to replace the siding on an entire building and/or house, etc. Following Step 122, at Step 124, method 100 is complete.

If, on the other hand, the service provider determines that a partial replacement is the better option at Step 120, method 100 may proceed to Step 130. At Step 130, the service provider may request custom manufacturing of replacement material. Step 130 may include sending any relevant information to a custom manufacturing facility. The relevant information may include identification of the material by manufacturer, brand, model, etc. and a requested amount of material needed to complete the partial replacement. The service provider may provide manufacturing specifications as appropriate, including textures, material selection, etc. In some embodiments, the service provider may provide specific manufacturing guidelines and/or computer (e.g., CAD or engineering drawing) files for use by the manufacturing facility.

In some embodiments of method 100, the service provider may own and/or operate a custom manufacturing facility. In these embodiments, Step 130 may include providing an internal work order from the representative and/or an app-based system to the provider's manufacturing facility.

At Step 132, the custom manufacturing facility may produce the replacement material(s) as identified in Step 130 by the manufacturing request. Custom manufacturing may include any known systems for manufacturing replacement materials, including roofing, siding, plumbing materials and/or fixtures, automotive parts, etc. For example, custom manufacturing may include additive manufacturing (sometimes called 3D printing, desktop manufacturing, and/or rapid manufacturing), referring to any process for laying successive layers of material to build a 3D object including, for example, selective laser sintering, selective laser melting, laminated object manufacturing, fused filament fabrication, fused deposition, etc. In some embodiments, additive manufacturing may be used to produce an entire replacement material. In other embodiments, additive manufacturing may be used to provide a finishing layer or technique to existing materials, for example additive manufacturing may be used to produce a veneer or other outer layer on an existing material. Other manufacturing methods in addition to 3D printing may include form pressing or the like. Additionally, any of these manufacturing methods or processes may include any types of materials, plastics, quartz, ceramics, etc., for example various siding panels may be formed through 3D printing but then coated or otherwise added to through other methods and using other materials.

The various custom manufacturing processes may allow a service provider to match materials that are no longer in production from the original manufacturer. In other examples, custom manufacturing may allow the service provider to match weathered and/or aged materials that no longer match the features of the materials as originally manufactured. These custom manufacturing processes may allow the service provider to execute a partial replacement of damaged materials, and therefore provide more cost-effective service, compared to available conventional repair processes.

At Step 134, the custom manufacturing facility may provide the custom replacement materials to an appropriate destination. For example, if the damaged materials are construction materials for a house, the replacement materials may be shipped to the home for installation. As another example, if the damaged materials are part of a vehicle, the replacement materials may be shipped to a body shop and/or repair shop for installation.

At Step 136, the service provider may request the customer assess the custom replacement materials to approve the match and/or other quality of the material before it is installed. The service provider may allow the customer to approve the replacement material rather than risk a dissatisfied customer and/or the need to replace the replacement materials. Additionally or alternatively, the service provider may assess the replacement materials and provide approval before installation.

Assuming the replacement material is approved at Step 136, the process may continue by conducting the repairs. The requested repairs may be performed using any appropriate methods and/or systems. For example, the service provider may contract with a roofing company to replace the entire roof, with a siding company to replace the siding on an entire building and/or house, etc.

At Step 138, method 100 is complete.

Figure 2:
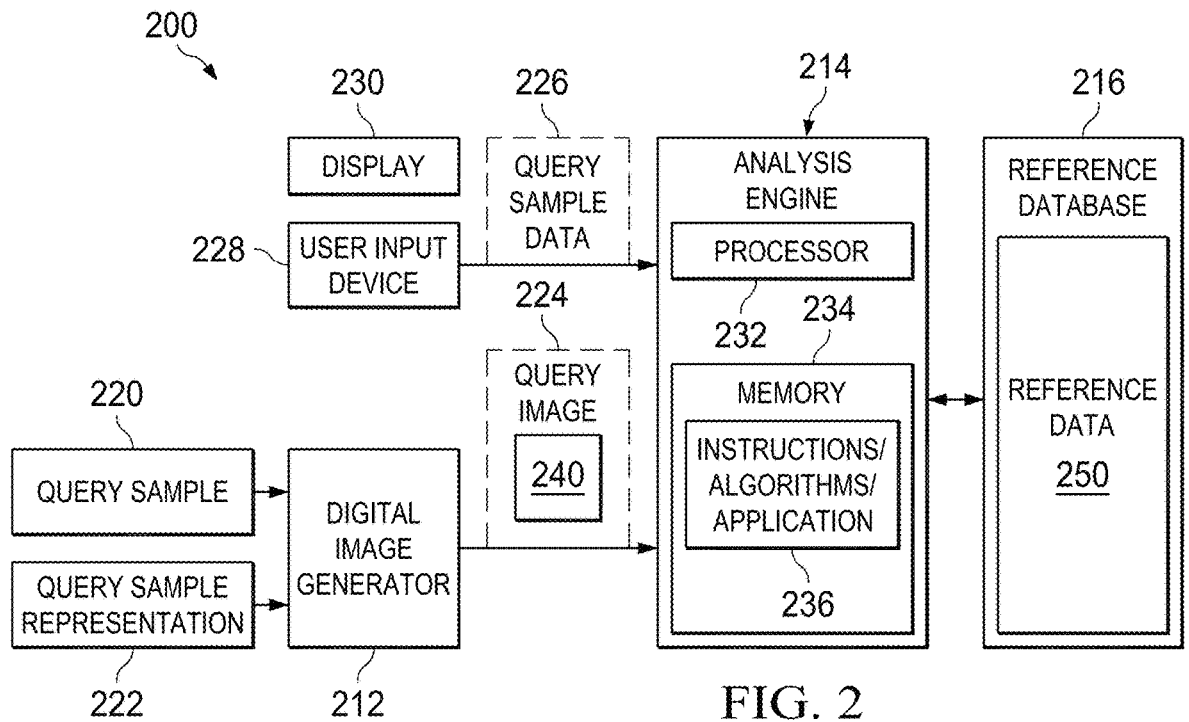
FIG. 2 is an illustrative system for identifying construction materials according to teachings of the present disclosure.

FIG. 2 is a drawing illustrating an example system 200 for identifying construction materials according to teachings of the present disclosure. In general, system 200 may be operable to identify one or more substantially similar products for unknown materials, e.g., a sample of siding to be replaced on a building having old or damaged siding or a sample of roofing materials. As shown, system 200 may include a digital image generator 212, an analysis engine 214, a reference database 216, a user input device 228, and a display device 230.

Digital image generator 212 may comprise any system or device configured to generate one or more digital images 224 of a material sample 220 or a material sample representation 222. As used herein, "digital images" may include image data or other digital data representative of the physical surface and/or appearance of a material sample or sample representation. For example, digital image generator 212 may be configured to generate a digital photographic image, a digital scanned image, or other digital data representative of a material sample 220 and/or a material sample representation 222. Thus, digital image generator 212 may be, for example, (a) a digital camera (e.g., a stand-alone camera or a camera incorporated in another device, such as a smart phone or personal digital assistant, for example), (b) a scanner (e.g., a flatbed scanner, photo scanner, sheet-fed scanner, portable handheld scanner, or a scanner incorporated in another device, such as a smart phone or personal digital assistant, for example), (c) a Light Detection and Ranging (LIDAR) system or device, (d) a digital elevation modeling (DEM) system or device, (e) a quality control surface inspection system or device, or any other device configured to generate digital data or images. As used herein, the term "sample" refers to any physical piece of the relevant material, or any portion thereof, e.g., a board, a shingle, a sheet of siding, any piece of the material to be replaced, or any portion thereof. A sample may be formed of any suitable type of material, e.g., vinyl, HardiPlank™, metal, or composite materials.

A "sample representation" may include any tangible representation of a sample. Examples of sample representations include: (a) a transferred ink image (e.g., an ink rubbing) of a sample (discussed below); and (b) a tangible image of a siding sample, e.g., a printed photographic or printed image of a sample.

Each digital image 224 of a sample 220 or a sample representation 222 of a sample 220 may include data regarding the physical texture of the sample 220. For example, the digital image 224 may indicate textural features such as grooves, recesses, protrusions, or other dimensional features that simulate wood grain, for example.

Analysis engine 214 may be configured to analyze data regarding a particular sample, referred to as a "query sample," to identify or attempt to identify the type of the query sample. For example, in some embodiments, analysis engine 214 may receive: (a) one or more digital images 224 of the query sample (e.g., a "query image") received from digital image generator 212; and/or (b) additional characteristic data 226 regarding the query sample. Additional characteristic data 226 may be accessed by analysis engine 214 from any suitable source in any suitable manner. For example, characteristic data 226 may be manually input by a user at user input device 228, automatically accessed from user input device 228 or other data source, or some combination of the two (e.g., in response to receiving particular characteristic data 226 input by a user, analysis engine 214 may automatically access further characteristic data 226 from user input device 228 or other data source based on the data input by the user).

Figure 3:
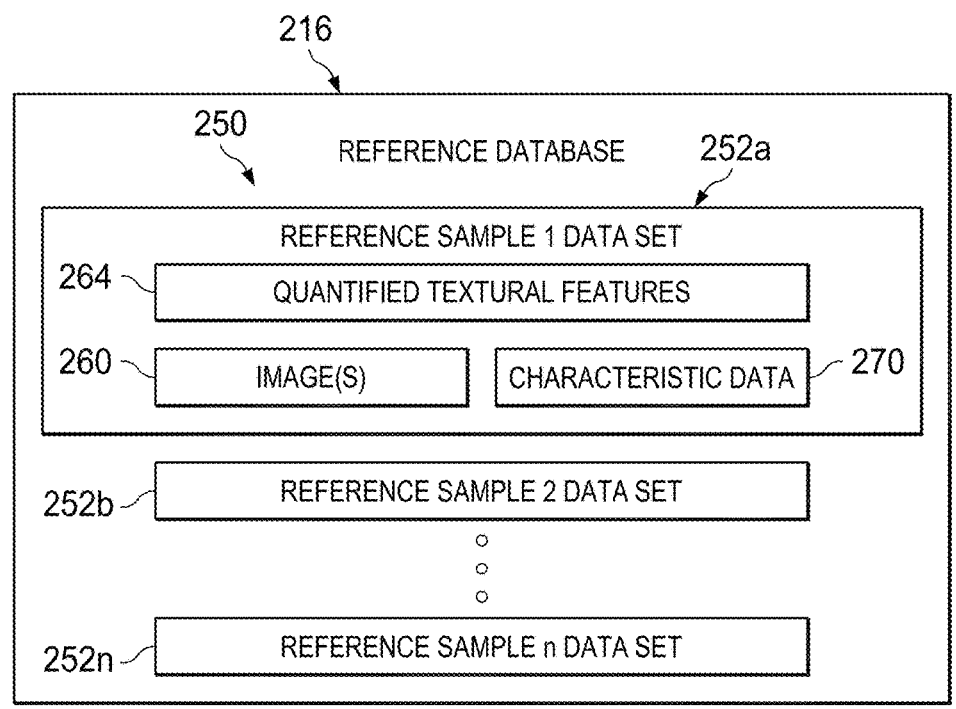
FIG. 3 is an illustrative database for use with the teachings of the present disclosure.

Referring to FIGS. 2 and 3, additional characteristic data 226 may include texture-related data and non-texture-related data regarding the query sample. For example, additional characteristic data 226 may include any or all of the following categories of data: (a) Material, (b) Style, (c) Face Size, (d) Profile, (e) Manufacturer, (f) Butt Size, (g) Thickness, (h) Weep Hole Shapes, (i) Nail Hem Shapes, (j) Water Marks, (k) Knot Designs, (l) Color, and/or any other categories. Each of these example categories is discussed in detail below with reference to FIG. 3.

As shown in FIG. 2, analysis engine 214 may include a processor 232 configured to execute instructions 236 stored in memory 234 for providing any of the various functionality of analysis engine 214. Processor 232 may include a microprocessor, a microcontroller, a digital signal processor (DSP), an application specific integrated controller (ASIC), electrically-programmable read-only memory (EPROM), or a field-programmable gate array (FPGA), or any other suitable processor(s), and may be generally operable to execute instructions 236 stored in memory 234. Instructions 236 may include any form of computer-readable instructions or code, e.g., one or more algorithms or applications. In some embodiments, instructions 236 include a analysis application configured to analyze query samples and provide user interaction with engine 214.

In some embodiments, analysis engine 214, user input device 228, and display 230 are communicatively coupled such that analysis engine 214 displays data on display 230, which may include user interface screens allowing a user to interact with analysis engine 214 via user input device 228, e.g., to enter query sample characteristic data 226, select other search parameters, view search results from engine 214, etc. Example screen shots generated by analysis engine 214 for allowing a user to interface with engine 214 via user input device 228 are provided in FIGS. 6A-6J, which are discussed below.

Memory 234 may store executable instructions 236 (e.g., algorithms 238) related to the operation of analysis engine 214. Memory 234 may comprise any one or more devices suitable for storing electronic data, e.g., RAM, DRAM, ROM, internal flash memory, external flash memory cards (e.g., Multi Media Card (MMC), Reduced-Size MMC (RS-MMC), Secure Digital (SD), MiniSD, MicroSD, Compact Flash, Ultra Compact Flash, Sony Memory Stick, etc.), SIM memory, and/or any other type of volatile or non-volatile memory or storage device. Instructions 236 may be embodied in any combination of software, firmware, and/or any other type of computer-readable instructions. For example, instructions 236 may be embodied in the form of an application and/or any suitable plug-ins, readers, viewers, updates, patches, or other code, which may be downloaded via the Internet or installed on the relevant computer device in any other known manner.

User input device 228 may comprise any device configured to receive instructions and/or input from a user related to identification system 210. For example, user input device 228 may provide a user interface for controlling the operation of analysis engine 214 and/or for entering data relevant to operation of analysis engine 214 or other components of identification system 210, e.g., characteristic data 226 regarding a particular query image. User input device 228 may include any suitable user interfaces, e.g., touch screen, keyboard, mouse, physical buttons, or any other suitable devices. In some embodiments, user input device 228 may include a mobile computing device such as a smartphone or a portable computer.

Display 230 may comprise any type of display device for displaying information related to identification system 210, such as for example, a monitor, LCD screen, or any other suitable type of display. In some embodiments, display 230 may be an interactive display (e.g., a touch screen) that allows a user to interact with identification system 210. In other embodiments, display 230 may be strictly a display device, such that all user input is received via user input device 228.

Reference database 216 may comprise any suitable database for storing reference data 250, and may be stored in any suitable memory device on any suitable computer (e.g., server, desktop computer, laptop computer, tablet-style computer, smartphone, PDA, etc.). In some embodiments, reference database 216 may be stored in memory 234, while in other embodiments reference database 216 may be stored separately and/or remotely from analysis engine 214.

As discussed in greater detail below with reference to FIG. 3, reference data 250 stored in reference database 216 may include various data related to any number of different reference samples 252. Analysis engine 214 may compare one or more query image(s) 224 and/or additional characteristic data 226 for an unknown material sample with such reference data 250 to identify one or more reference material samples 252 that match the unknown siding sample, in order to identify the unknown siding sample.

Depending on the particular embodiment, any or all of digital image generator 212, analysis engine 214, reference database 216, user input device 228, and display 230 may be integral with each other, or may be distinct from each other, in any suitable combination. For example, in some embodiments, all of digital image generator 212, analysis engine 214, reference database 216, user input device 228, and display 230 may be integrated in a single device, e.g., desktop computer, laptop computer, tablet-style computer, smartphone, personal digital assistant (PDA), or any other suitable electronics device. In other embodiments, digital image generator 212, analysis engine 214, reference database 216, user input device 228, and display 230 may all be separate devices, some or all of which may be connected by a network or other suitable communication links.

In other embodiments, analysis engine 214, reference database 216, user input device 228, and display 230 may be integrated in a single device (e.g., desktop computer, laptop computer, tablet-style computer, smartphone, PDA, or any other suitable electronics device), while digital image generator 212 is a separate device (e.g., a scanner, camera, or other image generator, e.g., provided as a stand-alone-device or provided by a laptop, smartphone, or PDA, for example). For example, a user may carry digital image generator 212 (e.g., in the form of a scanner, laptop, or smartphone) to a location of a sample 220 to be identified, use digital image generator 212 to generate a digital image 224 of the material sample 220 and/or of a sample representation 222 (e.g., a transferred ink image) of the sample 220 and then communicate or transfer the digital image 224 to analysis engine 214 (e.g., via any suitable communications links using any suitable communications protocols, or by physically transferring the digital image 224 using a USB drive, or in any other suitable manner).

In other embodiments, digital image generator 212 and user input device 228 may be integrated in a first device (e.g., desktop computer, laptop computer, tablet-style computer, smartphone, PDA, or any other suitable electronics device), while analysis engine 214, reference database 216, and display 230 are integrated in a second device (e.g., desktop computer, laptop computer, tablet-style computer, smartphone, PDA, or any other suitable electronics device). Alternatively, reference database 216 may be provided by a third device, separate and/or remote from analysis engine 214.

In other embodiments, digital image generator 212, user input device 228, and device 230 may be integrated in a first device (e.g., desktop computer, laptop computer, tablet-style computer, smartphone, PDA, or any other suitable electronics device), while analysis engine 214 and reference database 216 are integrated in a second device (e.g., desktop computer, laptop computer, tablet-style computer, smartphone, PDA, or any other suitable electronics device).

In other embodiments, digital image generator 212, user input device 228, analysis engine 214, and display 230 may be integrated in a first device (e.g., desktop computer, laptop computer, tablet-style computer, smartphone, PDA, or any other suitable electronics device), while reference database 216 is provided in a separate second device (e.g., in a separate server or other computer) remote from the first device. In such embodiments, the first device may communicate with the second device via any suitable communications links using any suitable communications protocols, e.g., to allow analysis engine 214 to access reference data 250 for analyzing a query image 224.

Embodiments may include any suitable configuration of identification system 10.

FIG. 3 is a drawing illustrating an example database 216 storing reference data 250 for use with the teachings of the present disclosure. Reference data 250 may include a number of reference sample data sets 252 (indicated as data sets 252*a*, 252*b* . . . 252*n*), each corresponding to a different reference sample. Such data may be accessed and used by analysis engine 214 for identifying or finding a similar product to the unknown material sample. More particularly, analysis engine 214 may access reference data 250 from reference database 216 and compare the digital image(s) 224 and/or additional characteristic data 226 regarding the query sample with reference data 250. Reference data 250 includes reference samples 252 to identify or "match" the query sample, referred to herein as "matching" samples. Thus, for example, a matching sample may be selected for replacing a damaged section of material corresponding to the query sample.

As used herein, material samples "match" if they are visually identical or substantially similar. In some embodiments, samples are "substantially similar" if a quantitative measure resulting from a pattern recognition analysis of the material samples (e.g., the "similarity score" discussed below) exceeds a predefined threshold, as disclosed further with respect to FIG. 5. For example, in one embodiment, each reference sample having a similarity score of about 70 with respect to a query sample is considered substantially similar to the query sample, and thus is identified as a "matching" sample. In other embodiments, "substantially similar" may be defined as the "n" most visually similar samples with respect to a particular sample (e.g., query sample), as determined by a fully or partially automated pattern recognition analysis, where n is any predefined number (e.g., 3, 4, 5, 6, 8, 10, etc.). For example, in an embodiment in which analysis engine 214 displays the five most similar reference samples to a query sample (e.g., the five reference samples having the highest similarity score with respect to the query sample), such five reference samples are considered substantially similar to the query sample, and thus are considered to be "matching" samples. In other embodiments, substantial similarity may be defined in any other suitable manner.

In the illustrated example of FIG. 3, each reference sample data set 252 may include one or more images 260, quantified visual features 264, and/or additional characteristic data 270. Image(s) 260 may comprise one or more digital images of a material sample or sample representation, e.g., a single image of a sample/sample representation or multiple images of different portions of a sample/sample representation to capture different textural patterns at different locations of the sample.

Quantified visual features 264 may include any features and/or feature characteristic that may be extracted and/or analyzed from an image 260 using any suitable image processing or pattern recognition algorithms, functions, applications, or systems (e.g., as embodied in instructions 236). As examples only, quantified visual features 264 may include image features, e.g., edges, corners, blobs, ridges, lines, curves, shapes, contours, objects, areas, etc. of an image 260 and/or characteristics of such features, e.g., quantity, shape, size, length, width, curvature, direction, orientation, clarity, color, distance between features, feature density, feature clustering, feature distribution, etc., and/or statistical distributions of any such features, that may be extracted and/or analyzed from the image using any suitable feature extraction tools or techniques, e.g., Gabor filters, local binary patterns (LBP), histogram of oriented gradients (HOG), etc. Similar to Gabor filters, LBP and HOG both reflect some statistical visual property or properties of the texture image 260.

Additional characteristic data 270 may include any data regarding any characteristics that may be useful in identifying a material sample. In this illustrated example, characteristic data 270 may include the following categories of data:

(a) Construction. The "construction" classification may identify the sample. Example "construction" classifications may include: aluminum (solid color), aluminum (variegated), composite, concrete fiber (asbestos), fiber cement, fiberglass, pressed board (Masonite), steel (solid color), steel (variegated color), vinyl (solid color), vinyl (variegated color), wood, etc.

(b) Style. Example "style" classifications may include: asbestos replacement, board and batten, clapboard, double beaded, dutchlap, full bead, half bead, half rounds, logs, masonry, panel, shakes, soffit-beaded, soffit-flat panels, soffit-U groove soffit, soffit-V groove soffit, vertical, etc.

(c) Face Size. Example "face size" classifications may include: 1", 1½", 1¹¹⁄₁₆", 1¾", 2", 2⅛", 2¼", 2⅝", 2⅔", 2¾", 2⅞", 3", 3⅛", 3¼", 3⅓", etc.

(d) Profile. Example "profile" classifications may include: D14", D3½", D3¾", D3⅝", D4¼", D4¾", D4", D5⅛", . . . D9", Flat shingle, Q2¼", etc. "Profile" is the industry nomenclature for the contour that is formed that shapes a construction material (e.g., siding) and gives it a distinctive look. Various profile classifications may be found in manufacturers' literature that describes their respective products. Some examples are found at http://www.progressivefoam.com/types-of-vinyl-siding, http://imgs.ebuild.com/xCat/ebuildWebB/15?ObjectID=25801&Variant=Original, and http://www.dixiehomecrafters.com/blog/types-of-vinyl-siding-horizontal-and-vertical-profiles.

(e) Manufacturer. Example "manufacturer" classifications may include: Alcan, Alcoa Home Exteriors, Allis Chalmers, Alside, Amcraft Building Products, Ashland Davis, Bird Vinyl Products, etc.

(f) Butt Size. The "butt size" classification is a measure of how far the bottom of a given siding material projects from the exterior wall plane. Example "butt size" classifications may include: ¼", ⅜", ½", ⅝", ¾", ⅞", 1", 1⅛", 1¼", etc.

(g) Thickness. The "thickness" classification is a measure of the physical thickness of the material. For example, for vinyl siding, the "thickness" classifications may range from 0.038" to 0.48" in increments of 0.02". Appropriate "thickness" classifications may similarly be provided for other types of materials, e.g., steel and aluminum siding.

(h) Weep Hole Shapes. Weep holes are an integral aspect of certain types of siding and other construction materials (e.g., certain vinyl siding) that provides a path for moisture to escape from behind the exterior cladding. The weep holes are typically located on the bottom or lower portion of the material when installed. Some manufacturers have developed weep holes in unique shapes. Thus, samples that include weep holes may be assigned to a predetermined weep hole shape. Example "weep hole shape" classifications may include "triangular with straight edges," "triangular with curved edges," "square," "non-square rectangular," "oval," "T-shaped," etc. Further, "weep hole shape" classifications may include a size factor. In addition, or alternatively, characteristic data 270 may include may include one or more stored images that represent each weep hole shape classification. These images or similar images may be displayed to a user entering characteristic data 226 for a query sample, to help the user identify the weep hole shape that corresponds to the query sample.

(i) Nail Hem Shapes. Certain types of construction materials include a nail hem that provides an area for mechanically fastening the material to the building and also locks the piece immediately above it. For some types of materials, the nail hem is produced with a distinctive design characteristic. Thus, certain types of materials can be classified according to the shape, design, and/or size of the nail hem. In addition, or alternatively, characteristic data 270 may include may include one or more stored images that represent each nail hem shape classification. These images or similar images may be displayed to a user entering characteristic data 226 for a query material sample, to help the user identify the nail hem shape that corresponds to the query sample.

(j) Water Marks. Water marks are lines provided in certain types of materials, typically oriented generally vertically, e.g., at a right angle to the main texture. Thus, certain types of materials can be classified according to the shape, size, orientation, or other aspect of the water marks.

(k) Knot Designs. Knot designs are areas provided in certain types of simulated wood materials (e.g., vinyl siding) that are designed in the shape of knots present in wood boards. Thus, certain types of materials can be classified according to the shape, size, orientation, or other aspect of the knot design.

(l) Color. Certain types of materials are manufactured in specific colors. Thus, these materials can be classified according to color. For example, color data for particular material samples (e.g., corresponding to a particular product and manufacturer) may include a list of all possible colors for the respective material sample, which data may be obtained from the manufacturer, a third party, or otherwise determined. In some embodiments, analysis engine 214 may be programmed to filter the possible matches for a query sample by comparing the color of the query sample with characteristic data 270, which includes color data, of reference samples. For example, a color number for the query sample can be cross matched to the correct manufacturer, product name, and/or color. The color of the query sample may be determined in any suitable manner, e.g., by digital image generator 212, by a spectrophotometer, or in any other suitable manner.

(m) Other. Characteristic data 270 may include any additional and/or different categories of data regarding each reference material sample.

Some or all of the categories of characteristic data 270 for reference samples 252 may correspond to some or all of the categories of characteristic data 226 regarding the query sample to be identified, such that the reference sample characteristic data 270 and the query sample characteristic data 226 can be analyzed, e.g., to filter the potential matches of the query sample.

Figure 4:
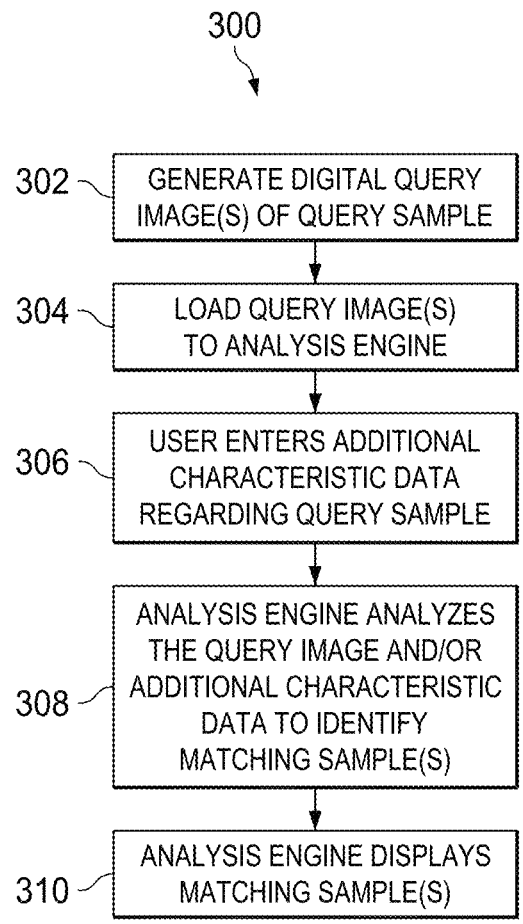
FIG. 4 is a flowchart of an illustrative method for analyzing a query regarding replacement material according to various aspects of the present disclosure.

FIG. 4 is a flowchart illustrating an example method 300 for analyzing a query regarding replacement material using analysis engine 214 to identify the query material sample, according to various aspects of the present disclosure.

At step 302, digital image generator 212 generates one or more digital images 224 of a material sample 220 or a sample representation 222.

At step 304, the query image 224 is loaded or communicated to analysis engine 214 or otherwise accessed by analysis engine 214, depending on the particular arrangement of system 210. In one example embodiment, digital image generator 212 generates a digital photograph of a material sample 220 and also digitizes a transferred ink image of the sample 220, both of which are loaded to analysis engine 214.

At step 306, a user may enter additional characteristic data 226 regarding the query sample, e.g., via user input device 228. In some embodiments, analysis engine 214 may present one or more user interface screens to the user that provide the user a software-based interface for selecting or otherwise entering classifications for one or more categories of characteristic data 226 regarding the query sample, e.g., any of the example categories discussed above.

At Step 308, analysis engine 314 analyzes query image 224 and/or additional characteristic data 226 to identify at least one matching sample(s). Next, at Step 310, analysis engine 314 displays the matching sample(s) on user input device 228 and/or display 230. During Step 310, the matching sample(s) may be displayed to the customer, the customer service representative, and/or the facility manufacturing the replacement materials, depending on the approval required to move forward with the repair process and other factors.

Figure 5:
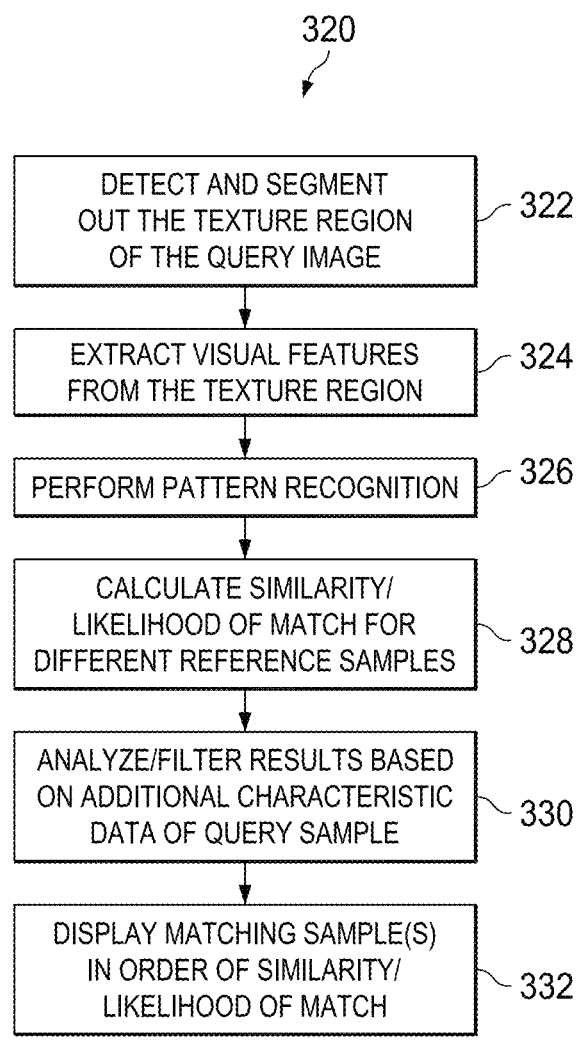
FIG. 5 is a flowchart of an illustrative method for identifying a material sample by comparison to reference samples using a reference database according to various aspects of the present disclosure.

With respect to Steps 308 and 310, FIG. 5 is a flowchart illustrating an example method 320 for identifying a material sample by comparison to reference samples using a reference database (e.g., database 216) according to various aspects of the present disclosure. Method 320 may be used to perform step 308 of method 300 analyzing a query image 224 and/or additional characteristic data 226 of a query material sample to identify one or more matching reference samples, according to an example embodiment.

At step 322 of method 320 (FIG. 5), analysis engine 214 may detect and segment out a texture region of the query image 224 for analysis. The actual image of the material sample may only cover a portion of the query image 224, and thus analysis engine 214 may identify and isolate the texture region from the query image 224 using any suitable detection and segmentation techniques.

At step 324, analysis engine 214 may extract quantified visual features 240 (FIG. 2) from the texture region, or from each of a number of "patches" of the texture region. A "patch" is a small sub-region of the query image 224. For example, supposing the texture region is 512×128 pixels, analysis engine 214 may crop the texture region into 16 sub-regions, or "patches," of 64×64 pixels each. Patches may be generated in any suitable manner, e.g., using overlap or other suitable techniques.

In one embodiment, analysis engine 214 may use a set of Gabor filters with different frequencies and orientations to extract useful Gabor features from the texture region (or patches of the texture region) of query image 224, e.g., extracting edges and edge properties such as edge frequencies and orientations, for example. The Gabor features may correspond to grain lines or other lines or contours of the material sample. Analysis engine 214 may extract the distances between the identified Gabor features (e.g., edges or lines), the orientation of the features, the thickness of the features (e.g., edge or line thickness), the average number of features per square inch, and/or any other suitable characteristic of the identified features. A visualization of an example Gabor feature extraction is illustrated at http://www.cs.utah.edu/~arul/report/node13.html.

At step 326, analysis engine 214 may perform a pattern recognition technique to classify the query sample and/or identify potential matches for the query sample based on the visual features 240 extracted from the texture region (or from different patches of the texture region) of the query image 224. In some embodiments, analysis engine 214 may analyze visual features (e.g., Gabor features) extracted from the texture region to identify potentially matching reference samples 252, based on quantified visual features 264 (e.g., Gabor features) extracted from reference sample images 260 stored in reference database 216. Thus, analysis engine 214 may compare the quantified visual features extracted from each patch of the texture region with the quantified visual features 264 extracted from reference images 260 stored in reference database 216 for different reference material samples, using any suitable algorithms. This may include comparing the distribution (e.g., probability distribution) of identified visual features extracted from the query texture region with distributions (e.g., probability distributions) of visual features 264 in different reference material sample data set 52a-52n to quantify the level of visual similarity between query image 224 and different individual reference samples.

Further, in some embodiments, analysis engine 214 may compare or analyze a particular type of query image 224 with reference to the same type of reference images 260 (e.g., analysis engine 214 may compare or analyze quantified visual features extracted from a particular type of query image 224 with quantified visual features 264 extracted from the same type of reference images 260). For example, analysis engine 214 may compare or analyze a digitized transferred ink image 224 of a query sample with reference to digitized transferred ink images of one or more reference samples. As another example, analysis engine 214 may, alternatively or additionally, compare or analyze a digital photographic image of a query sample with reference to digital photographic images of reference material samples.

At step 328, based on performing pattern recognition through analysis of visual features 264 at step 326, analysis engine 14 may calculate a level of similarity (e.g., similarity score) between the query texture region and different reference material samples 252, using any suitable algorithms or techniques. For example, an algorithm or technique may be used by analysis engine 14 to quantify and/or qualify the number or quality of matching features between reference sample data 252 and those of query image 224. Using such techniques, it is possible to develop a similarity score based on the number/quality of matching features or textures between query image 224 and reference sample data 252. The similarity score may be calculated based on weight given to certain match criteria, the number of matched features or textures, and/or other data or information. In embodiments, a predetermined threshold is established for defining a match (e.g., a similarity score of approximately 70 or higher may indicate a potential match).

Moreover, analysis engine 214 may utilize any suitable pattern recognition algorithms or techniques for performing step 326 and/or step 328, e.g., a Gaussian Mixture Model (GMM), a support vector machine (SVM) model, a combination thereof (e.g., Gaussian kernel SVM), k-nearest neighbor (k-NN), Artificial Neural network, or any other suitable pattern recognition algorithms or techniques. For example, analysis engine 214 may use one or more of such pattern recognition algorithms or techniques to compare features or statistical distributions of features of the query image 224 with features 264 or statistical distributions of features 264 of various reference siding samples 252.

Analysis engine 214 may thereby perform a supervised pattern recognition analysis. Such pattern recognition methods include two steps: training and testing. In the training stage, analysis engine 14 may collect "training" samples 252 and extract features 264 from such samples 252. Then analysis engine 214 may use pattern recognition techniques to learn a pattern recognition function based on the distribution of features 264 of the training data. In the testing step, analysis engine 214 may use this function to estimate the likelihood of a query image 224 matching various reference samples by analyzing the distribution of features extracted from the query image 224.

In embodiments in which different "patches" of the texture region are evaluated individually, analysis engine 214 may calculate a joint likelihood of matching between the multiple patches and different individual reference siding samples or different texture groups, using any suitable algorithms.

At step 330, analysis engine 214 may further analyze, through filtering, the level of similarity between the query sample and reference samples based on additional characteristic data 226 regarding the query sample (e.g., as received at step 306 of method 300 discussed above), using any suitable algorithms. For example, analysis engine 214 may compare additional characteristic data 226 regarding the query sample with characteristic data 270 in reference sample data sets 252a-252n to filter the potentially similar reference samples. In some embodiments, analysis engine 214 may conclusively filter potentially similar reference samples based on the comparisons of one or more specified categories of characteristic data 270, such that each reference sample that does not match the classification of the query sample (e.g., the particular material, style, face size, etc.) is excluded as a potential match. In other embodiments, analysis engine 214 may consider the results of the comparisons between query sample characteristic data and reference sample characteristic data 270, without conclusively filtering results based on such comparison results.

For example, analysis engine 214 may apply a suitable algorithm that factors such comparison results into the calculated level of similarity between a query sample and reference sample, without necessarily excluding the reference sample if one or more characteristic data classifications do not match. Thus, analysis engine 214 may include an algorithm that processes the comparison of visual features 264 and the comparison of characteristic data 270 as weighted factors to calculate an overall similarity score for each of a number of reference samples (as compared to the query sample).

After determining one or more samples that match the query sample, analysis engine 214 may output the one or more matching samples in any suitable manner at step 332. For example, analysis engine 214 may display or identify the best match (e.g., the reference sample having the highest similarity score) or multiple matching samples in order of similarity (e.g., based on a determined score for each sample).

FIGS. 6A-6G are drawings showing example screenshots that might be generated by an application for display on a user's mobile device, according to teachings of the present disclosure. For example, as shown in FIG. 6A, the insured may use a mobile device 510 to execute an app or a website for making a claim. Using the app/website, the user/insured may select "Claims Center" to initiate the making/filing of a claim. At the Claims Center, as shown in FIG. 6B, the insured is able to report an accident, report damage, or select other relevant options. As shown in FIG. 6C, if the insured selectively inputs damage, the app/website will prompt him/her to select where the damage occurred (e.g., roof, siding, storm water, etc.). It may be appreciated that the user may be able to select more than one location of the property (e.g., house, car, building, etc.) where the damage occurred.

Referring to FIG. 6D, once the location(s) of the damage is selected, the app/website will prompt the insured to take a photograph of the damage using mobile device 510 (e.g., computer, smartphone, tablet, etc.). At FIG. 6E, the app/website will then allow the insured to crop or otherwise adjust the photo. As shown in FIG. 6F, based on the photo, the insured also may be able to input additional parameters, such as material, face size, color, and/or style. The app/website will then generate a search results, as shown in FIG. 6G, and the insured is able to best select the material choice that was damaged to complete this reporting of information. If additional information is needed, the app/website may ask for such information before completing the filing of the claim. Once the information is reported, the app/website may have further functions that provide information to a manufacturing facility or other mechanism for obtaining the necessary materials to replace or repair the damaged materials. As is apparent from the disclosure herein and at least FIGS. 6A-6G, the insured is able to easily report and document damage merely using his/her mobile device 510.

Figure 7:
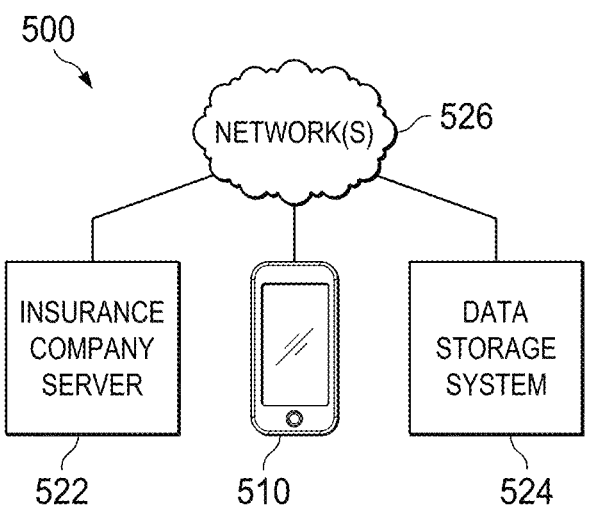
FIG. 7 is an illustrative system for executing the methods of at least FIGS. 4 and 5.

FIG. 7 is a drawing illustrating an example system 500 for executing method 100 and other embodiments of the present disclosure, providing communication between a user device (e.g., mobile device 510) and other external systems or devices, according to certain embodiments. As shown, mobile device 510 may be communicatively connected to one or more remote server(s) 522 and/or at least one remote data storage system(s) 524 via one or more networks 526. Mobile device 510 may be used to display the various screens shown in FIGS. 6A-6G.

Servers 522 may include one or more components or devices operable to receive data from mobile device 510 and further process and/or display such data to the user via mobile device 510, personal digital assistants (PDA), laptop computers, desktop computers, or any other device. In some embodiments, a server 522 may include any suitable application(s) for interfacing with mobile device 510, e.g., providing application(s) to be downloaded via the Internet or otherwise installed on mobile device 510.

Remote data storage devices 524 may include any one or more data storage devices for storing driving data received from mobile device 510 and/or servers 522. Remote data storage 524 may comprise any one or more devices suitable for storing electronic data, e.g., RAM, DRAM, ROM, flash memory, and/or any other type of volatile or non-volatile memory or storage device. Remote data storage device 524 may include any suitable application(s) for interfacing with mobile device 510 and/or with relevant applications running on servers 522.

Network(s) 526 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data) via any one or more wired and/or wireless communication links.

In some embodiments, mobile device 510 may be used to request a repair for damage to an insured automobile, residence, or building. For example, a user may engage mobile device 510 to access an insurance company's website, to send an email request, and/or any other appropriate means of communicating with an insurance company. When an insurance company receives a request for a repair, servers 522 may communicate various options back to the user through mobile device 510, such as providing the user an option to download an application for mobile device 510 that would make repair requests and/or manage a repair process.

Figure 8:
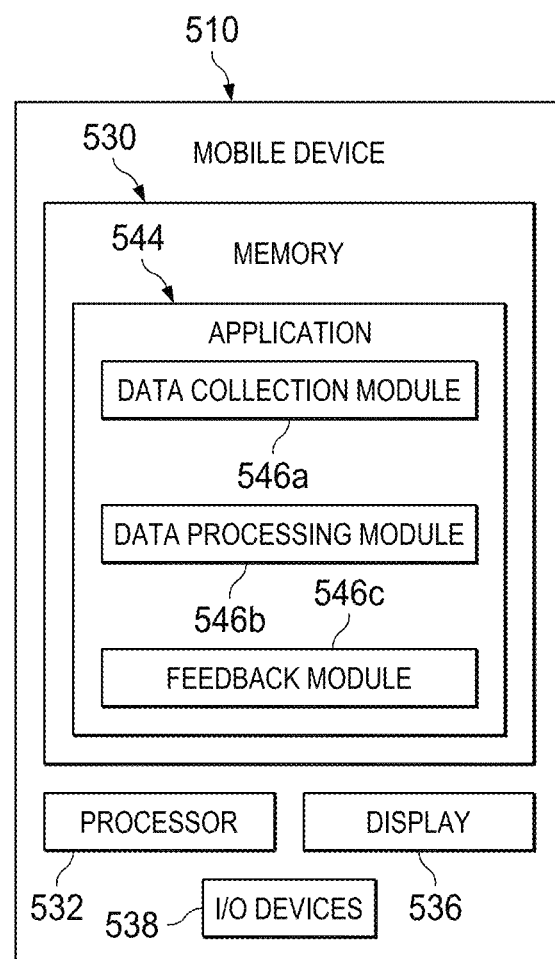
FIG. 8 is an illustrative mobile device for use with the teachings of the present disclosure.

FIG. 8 is a drawing illustrating example components of mobile device 510 for use with the teachings of the present disclosure. As shown, mobile device 510 may include a memory 530, processor 532, a display 536, and input/output devices 538.

Memory 530 may store various applications to run or be executed by processor 532. Memory 530 may comprise one or more devices suitable for storing electronic data, e.g., RAM, DRAM, ROM, internal flash memory, external flash memory cards (e.g., Multi Media Card (MMC), Reduced-Size MMC (RS-MMC), Secure Digital (SD), MiniSD, MicroSD, Compact Flash, Ultra Compact Flash, Sony Memory Stick, etc.), SIM memory, and/or any other type of volatile or non-volatile memory or storage device.

Memory 530 may store various applications 544 which, when executed, direct the actions of processor 532. An application 544 may be described in terms of functional modules 546a, 546b, 546c, each embodied in a set of logic instructions (e.g., software code). For example, as shown in FIG. 8, application 544 may include a data collection module 546a, a data processing module 546b, and a feedback module 546c.

Processor 532 may include a microprocessor, a microcontroller, a digital signal processor (DSP), an application specific integrated controller (ASIC), electrically-programmable read-only memory (EPROM), or a field-programmable gate array (FPGA), or any other suitable processor(s), and may be generally operable to execute various applications, as well as supporting any other functions of mobile device 510.

Display 536 may comprise any type of display device for displaying information related to a user, for example, an LCD screen (e.g., thin film transistor (TFT) LCD or super twisted nematic (STN) LCD), an organic light-emitting diode (OLED) display, or any other suitable type of display. In some embodiments, display 536 may be an interactive display (e.g., a touch screen) that allows a user to interact with applications running on processor 532. In other embodiments, display 536 may be strictly a display device, such that all user input is received via other input/output devices 538.

Input/output devices 538 may include any suitable interfaces allowing a user to interact with mobile device 510. For example, input/output devices 38 may include a camera, a touchscreen, physical buttons, sliders, switches, data ports, keyboard, mouse, voice activated interfaces, or any other suitable devices.

While this disclosure includes illustrative designs, such designs may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed:

1. A method for generating material replacement, the method comprising:
   receiving, by a server, an image of a sample of an original material needing to be replaced;
   generating, by the server, representative data for the original material based upon the received image;
   accessing, by the server, a reference database that stores reference data for a plurality of different materials including reference texture data or reference characteristic data for each material of the plurality of different materials;
   comparing, by the server, the representative data for the original material to the reference data in the reference database to identify at least one material of the plurality of different materials that correlates with the original material;
   determining, by the server, if the at least one material of the plurality of different materials that correlates with the original material is not available in a needed amount and if the original material is aged beyond a predetermined threshold;
   sending, by the server, a request to generate a replacement material for the at least one material of the plurality of different materials that correlates with the original material; and
   generating the replacement material by manufacturing the replacement material.

2. The method of claim 1, further comprising providing the replacement material for a partial replacement in an insured loss.

3. The method of claim 1, wherein the original material includes at least one siding for a building, a roofing material, a window sill, a window trim, a plumbing fixture, a plumbing joint, a plumbing material, an automotive component, and an automotive material.

4. The method of claim 1, wherein receiving the image includes receiving the image from a client or a claim representative of an insurance company.

5. The method of claim 4, wherein the received image from the client or the claim representative of the insurance company is transmitted using a mobile device running an application for communication with the server.

6. The method of claim 1, wherein the reference characteristic data include at least one of: a color, a texture, a construction material type, a construction material style, a construction material face characteristic, a construction material profile characteristic, and a construction material manufacturer name.

7. The method of claim 1, further comprising receiving a request including an amount of replacement material needed.

8. The method of claim 1, wherein sending the request to generate the replacement material includes sending the request to a custom manufacturing facility and sending a needed amount of the replacement material.

9. The method of claim 8, wherein generating the replacement material by manufacturing the replacement material includes using an additive manufacturing process to manufacture the replacement material at the custom manufacturing facility.

10. The method of claim 9, further comprising transmitting files for the additive manufacturing process of the replacement material from the reference database to the custom manufacturing facility.

11. The method of claim 1, wherein the received image includes a digital image of a transferred ink pattern of the original material.

12. The method of claim 1, wherein comparing the representative data for the original material to the reference data in the reference database to identify the at least one material of the plurality of different materials that correlates with the original material includes:
  determining a similarity score for the representative data based upon similarities to the reference data in the reference database; and
  identifying the at least one material of the plurality of different materials that correlates with the original material based upon the similarity score for the representative data.

13. A system for generating a partial material replacement, the system comprising:
  a processor;
  a non-transitory storage medium; and
  a set of computer readable instructions stored in the non-transitory storage medium that, when executed by the processor, cause the processor to:
    receive an image of a sample of an original material needing to be replaced;
    generate representative data for the original material based upon the received image;
    access a reference database that stores reference data for a plurality of different materials including reference texture data or reference characteristic data for each material of the plurality of different materials;
    compare the representative data for the original material to the reference data in the reference database to identify at least one material of the plurality of materials that correlates with the original material;
    determine if the at least one material of the plurality of different materials that correlates with the original material is not available in a needed amount and if the original material is aged beyond a predetermined threshold;
    send a request to generate a replacement material for the at least one material of the plurality of different materials that correlates with the original material; and
    generate the replacement material by manufacturing the replacement material.

14. The system of claim 13, wherein the set of computer readable instructions that cause the processor to generate the replacement material by manufacturing the replacement material further include instructions that cause the processor to use an additive manufacturing process to manufacture the replacement material.

15. The system of claim 14, wherein the replacement material includes a veneer layered on an existing substrate.

16. The system of claim 13, wherein the reference database stores design specifications for additive manufacturing of the plurality of different materials.

17. A method for generating a partial material replacement, the method comprising:
  providing, by a server, a claims handling application to a user for installation on a client device of the user;
  collecting, by the server, claims data transmitted by the client device through the claims handling application;
  receiving, by the server, an image of a sample of an original material needing to be replaced;
  generating, by the server, representative data for the original material based upon the received image;
  accessing, by the server, a reference database that stores reference data for a plurality of different materials including reference texture data or reference characteristic data for each material of the plurality of different materials;
  comparing, by the server, the representative data for the original material to the reference data in the reference database to identify at least one material of the plurality of materials that correlates with the original material;
  determining, by the server, if the at least one material of the plurality of different materials that correlates with the original material is not available in a needed amount and if the original material is aged beyond a predetermined threshold;
  sending, by the server, a request to generate a replacement material for the at least one material of the plurality of different materials that correlates with the original material; and
  generating the replacement material by manufacturing the replacement material.

18. The method of claim 17, wherein the replacement material is manufactured using at least one additive manufacturing process.

19. The method of claim 18, wherein the request further includes design specifications for additive manufacturing of the replacement material.

* * * * *